DEVICE FOR AUTOMATICALLY ELIMINATING ERASE OSCILLATOR INTERFERENCE IN A COMBINED RADIO AND MAGNETIC RECORDER

Filed March 22, 1967 3 Sheets-Sheet 1

INVENTORS
RUDOLF RAINER
RUDOLF DRABEK
BY
Frank R. Trifari
AGENT

DEVICE FOR AUTOMATICALLY ELIMINATING ERASE OSCILLATOR INTERFERENCE IN A COMBINED RADIO AND MAGNETIC RECORDER

Filed March 22, 1967 3 Sheets-Sheet 2

INVENTORS
RUDOLF RAINER
RUDOLF DRABEK
BY
Frank R. Trifari
AGENT

INVENTORS
RUDOLF RAINER
RUDOLF DRABEK
BY
Frank R. Jeffrey
AGENT

United States Patent Office 3,526,727
Patented Sept. 1, 1970

3,526,727

DEVICE FOR AUTOMATICALLY ELIMINATING ERASE OSCILLATOR INTERFERENCE IN A COMBINED RADIO AND MAGNETIC RECORDER

Rudolf Rainer and Rudolf Drabek, Vienna, Austria, assignors, by mesne assignments, to U.S. Philips Corporation, New York, N.Y., a corporation of Delaware Filed Mar. 22, 1967, Ser. No. 625,087
Claims priority, application Austria, Mar. 24, 1966, A 2,800/66
Int. Cl. H04b *1/14, 15/04;* G11b *31/00*
U.S. Cl. 179—100.11 9 Claims

ABSTRACT OF THE DISCLOSURE

When a radio receiver and magnetic recorder are combined, interference can result due to the presence of a harmonic of the recorder erasing oscillations within the band of a received signal. In order to shift the erase oscillator frequency to avoid such interference, the oscillations are mixed with the local oscillations of the receiver (after passing through a resonant circuit tuned synchronously with the receiver tuner). The resultant intermediate frequency signal is detected, for example by a frequency demodulator, to produce a control voltage for controlling the erase oscillator.

Figure 1:
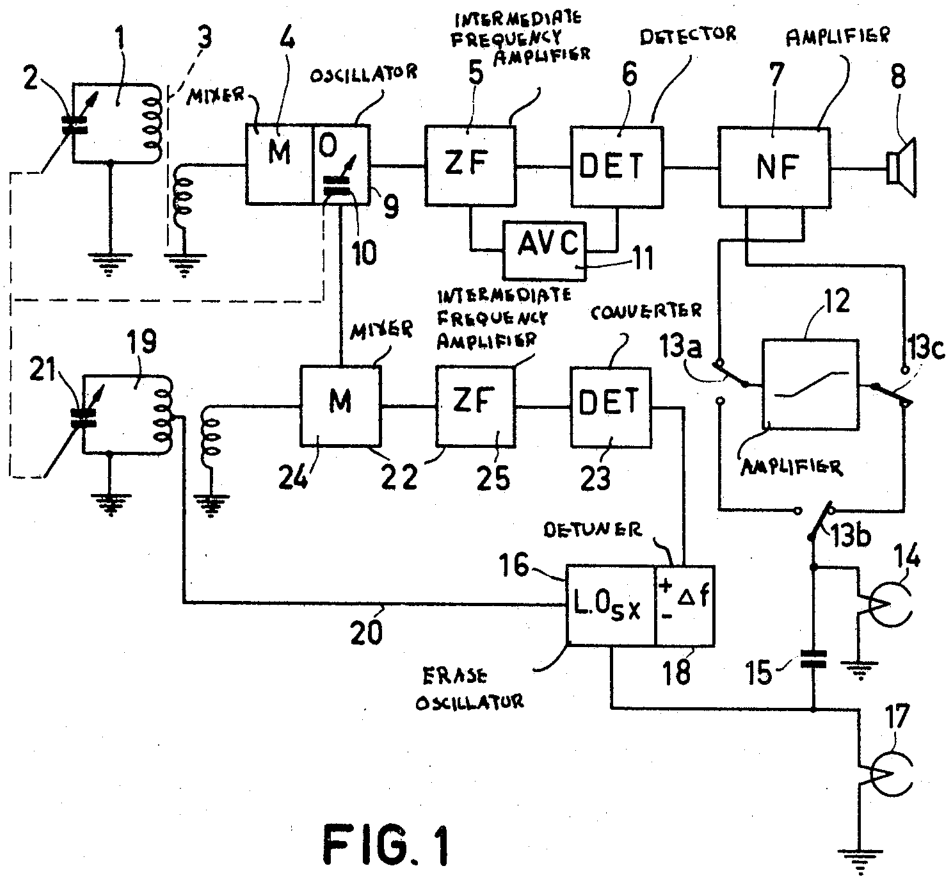

The invention relates to a device for radio reception and magnetic recording and/or playback, said device comprising a resonant circuit adapted to be tuned synchronously by the tuning indicator to the input frequency to which the receiver is tuned, to which circuit the signal from the oscillator of the recording member is applied and from which circuit is derived the signal produced in it by harmonics of the erasing oscillator, which signal is rectified and applied to a device for frequency detuning of the erasing oscillator. When in such devices the radio receiver and the recording apparatus are simultaneously operative, disturbances in the receiver can in this way be avoided, which disturbances might be produced by a radiation of the erasing oscillator and by the erasing head connected thereto switched on during the recording process, affecting the high-frequency part.

The fact that the harmonics of the erasing oscillator are capable of interfering with the frequency range of the radio transmitter, is due to the input sensitivity of modern radio receivers of the order of a few $\mu$v. per m. and to the alternating-voltage amplitudes of the erasing oscillator of at least a few volts. The frequency of the erasing oscillator is usually about 45 kc./s. Therefore, the longwave range of about 147 to 285 kc./s. includes the fourth, fifth and sixth harmonics and the mediumwave range of about 530 to 1610 kc./s. includes the twelfth to the thirty-sixth harmonics of the erasing oscillator. If no special precautions are taken, these harmonics have such a strength that they produce whistle. This phenomenon is the more conspicuous, the smaller are the apparatus, in which the erasing oscillator is arranged nearer the input circuit of the receiver.

These interferences are particularly strong in apparatus comprising ferrite rod-shaped aerials, since these do not allow the use of screening in the aerial circuit.

Such interferences are particularly inconvenient, if a direct recording of the radio reception has to be made, since they deteriorate the recording. The very difficulty is that it is not known beforehand whether at the relevant tuning of the receiver the erasing oscillator will produce disturbances or will not do so, when switched on. If a disturbance occurs when the recording apparatus is switched on, part of the record is at any rate disturbed before it is possible to take steps for avoiding this disturbance.

In the device described above these difficulties are avoided by switching over automatically the erasing oscillator frequency to a value, at which no harmonics are lying in the tuning concerned of the radio receiver, immediately when a disturbance appears. This is achieved by causing each harmonic of the erasing oscillator, appearing in the resonant circuit, to actuate the frequency-detuning member thereof.

In practice it has been found that on the one hand the harmonics of the erasing oscillator appearing in the resonant circuit often have too small an amplitude for safeguarding the actuation of the detuning member, and on the other hand this member is often actuated by other signals appearing in said resonant circuit in an undesired manner, since the selectivity of said member is inadequate. According to the invention these difficulties are obviated in a simple manner by providing a mixing stage for selective amplification and signal conversion of the signal derived from the resonant circuit and by providing intermediate-frequency amplifying circuits, connected to said mixing stage and rectifying the signal, whilst the oscillator signal is applied to the mixing stage for transforming the frequency of the harmonics of the erasing oscillator to the same intermediate frequency as that of the receiver. It is thus ensured that only actually disturbing harmonics of the erasing oscillator, even those having only a small amplitude, actuate the frequency-detuning member. Thus, independently of the tuning concerned, the device is always reliable in operation.

Since the receiver itself also includes a mixing stage and a subsequent intermediate-frequency amplifier for selective amplification, these parts may, in accordance with the invention, also be employed advantageously for the amplification of the harmonics of the resonant circuit. For this purpose there is provided a circuit by means of which, for the amplification and conversion of the signal derived from the resonant circuit, the mixing stage of the receiver can be switched over from the the input circuit of the receiver to the resonant circuit, whilst simultaneously the intermediate-frequency amplifier or the detector of the receiver can have connected to it, with the interposition of a bistable multivibrator for storing the signal in its operational state, the frequency-detuning member of the erasing oscillator. A further simplification of such an arrangement is obtained by connecting the multivibrator, which controls the frequency-detuning member of the erasing oscillator by means of said circuit, to an A.V.C. controlled intermediate-frequency amplifying stage of the receiver for direct currents, since in this way both the detector and the controlled intermediate-frequency amplifier of the receiver, in which the direct-current portion of the detected signal is amplified, are utilized for the production of the control-magnitude of the frequency-detuning member. It is, moreover, advantageous that, when the mixing stage is switched from the input circuit of the receiver at the same time the circuit connects the tuning element of the input circuit to a circuit element having the same impedance as the circuit element co-operating in the input circuit with the tuning element in order to form the resonant circuit. Consequently, there is no need for using a particular tuning member; it is sufficient to employ the conventional tuning elements of such radio receivers, for example, a variable capacitor or an inductive tuning member.

The invention will now be described more fully with reference to the drawing, which shows a few embodiments, to which the invention, is, however, not restricted; further advantages will become evident.

Figure 2:
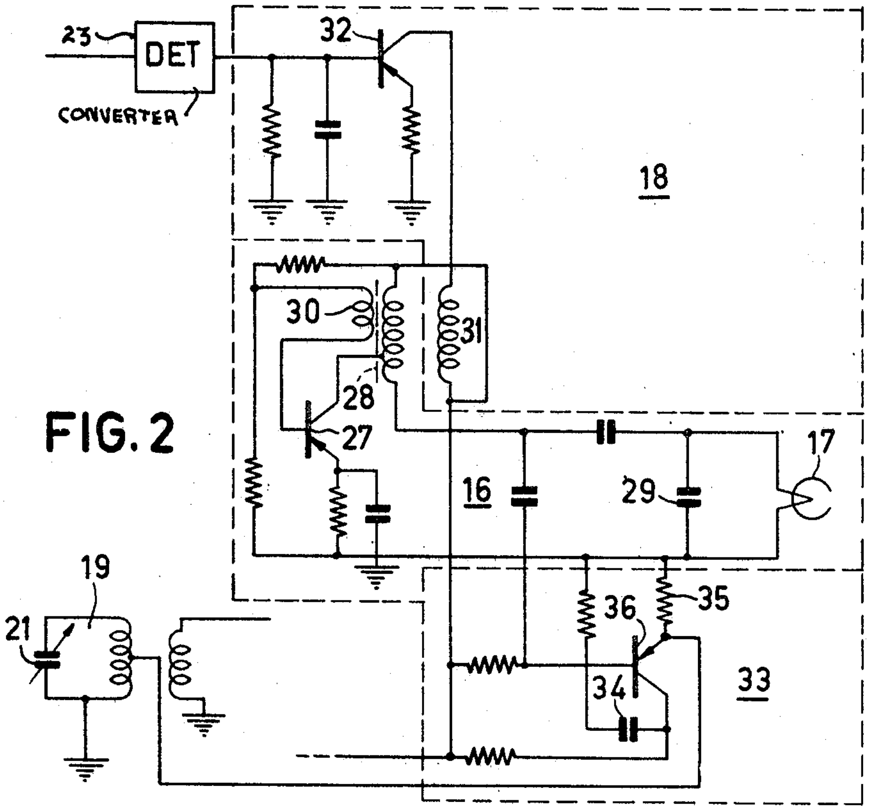
Figure 3:
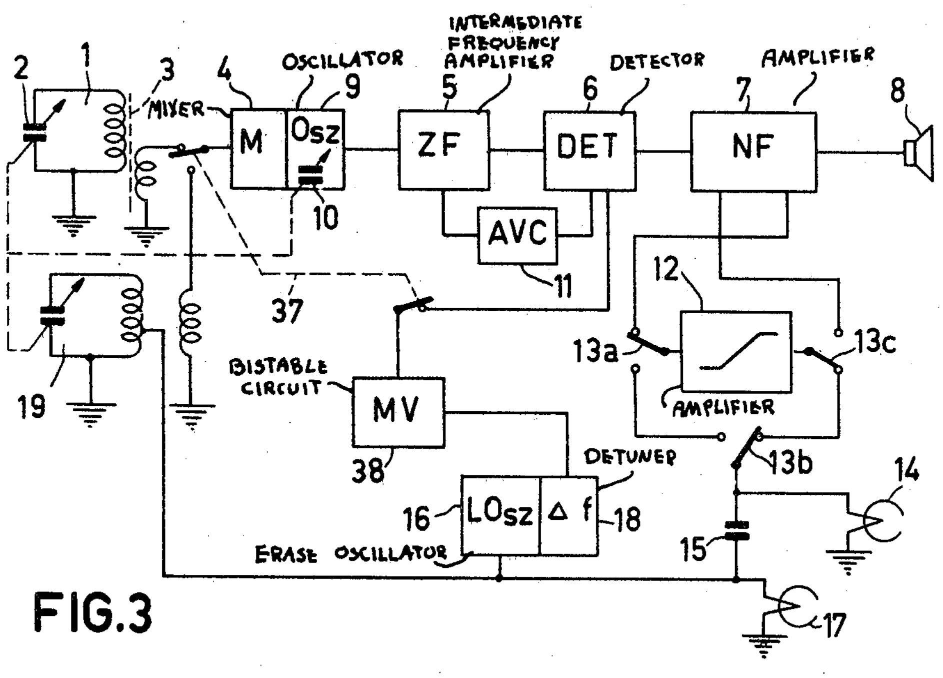
Figure 4:
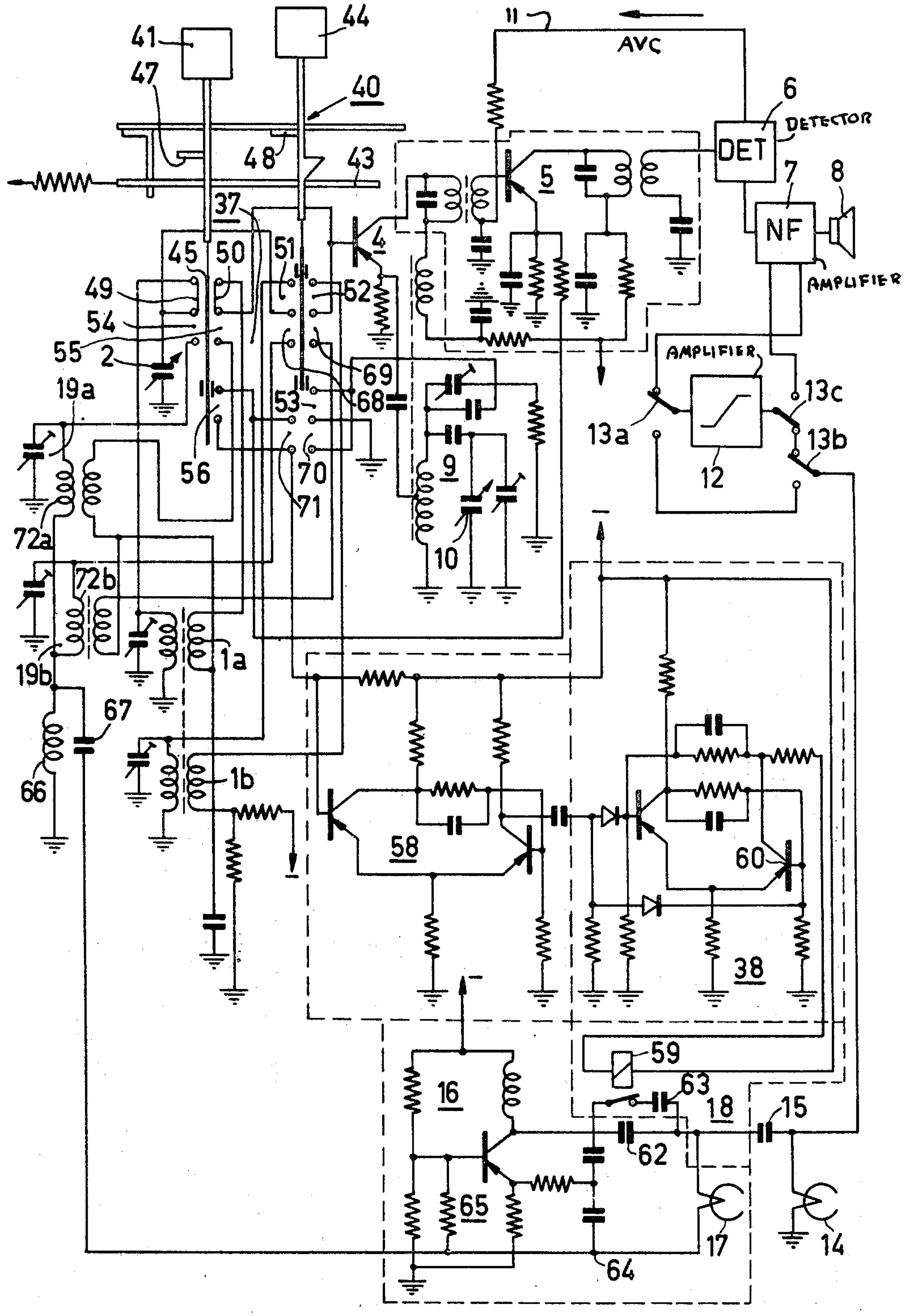

FIG. 1 shows an embodiment of a device according to the invention in a block diagram. FIG. 2 shows an erasing oscillator circuit and a frequency-detuning member connected thereto and a filter for emphasizing the harmonics of the erasing oscillator. FIG. 3 shows a further embodiment in which the mixing stage of the I.F. amplifier and of the detector of the receiver also serve for obtaining the control-magnitude of the frequency-detuning member, also in a block diagram. FIG. 4 shows an embodiment corresponding with the principle of the embodiment shown in FIG. 3 in detail.

Referring to FIG. 1, reference numeral 1 designates the input circuit of a radio receiver, adapted to be tuned by means of a variable capacitor 2 and connected to a ferrite aerial 3. To this input circuit are connected in a conventional manner: a mixing stage 4, an I.F. amplifier 5, a detector 6, a low-frequency amplifier 7 and the loud speaker 8. The mixing stage 4 may be self-oscillating and in this case the oscillator 9 can be tuned by means of a variable capacitor 10, coupled with the variable capacitor 2. The I.F. amplifier 5 is controlled by the detector 6 through a member 11. For magnetic recording an amplifier 12 is provided, which comprises the conventional filters and whose input can be connected through a switch 13*a* for recording the radio reception to the L.F. amplifier 7 and via a further switch 13*b* for playback to a magnetic head 14. The output of the amplifier 12 is connected via a switch 13*c* and the switch 13*b* to the magnetic head 14 for recording and to the L.F. amplifier 7 for playback. The further circuitry for switching on the recording or playback processes, such as the control-members for the switched and the like are omitted for the sake of simplicity. As usual the recording is made by means of high-frequency bias, for which purpose there is provided an oscillator 16, serving, in addition, an erasing oscillator, which is switched on, as usual, only for recording. The signal of the oscillator 16 is applied on the one hand to an erasing head 17 for erasing any previous records and on the other hand through a capacitor 15 to the magnetic head 14, serving as a recording- and play-back head, for biasing.

In the position shown for the switch 13 a signal received by the radio receiver can be recorded directly. If the tuning is then such that the input frequency of the radio receiver is a multiple of the frequency of the erasing oscillator and if the erasing oscillator has such a harmonic of adequate amplitude that it becomes effective in the input circuit 1 and also in the mixing stage itself, this signal is also converted into an I.F. signal, so that, as is known, the receiving part is disturbed. Since the sensitivity of the radio receiving part is very high, harmonics of a high order may still have a disturbing effect and the more so, the nearer the oscillator is arranged to the input circuit, which is particularly the case in small apparatus of this kind. As stated above, such disturbances may appear not only in the longwave range but also in the whole medium wave range.

In order to avoid these disturbances the erasing oscillator 16 has connected to it a member 18 for detuning its frequency, which member is fed by a device which assesses whether at the tuning the receiving part is disturbed or not disturbed by a harmonic of the erasing oscillator; in the first-mentioned case said device detunes the frequency of the erasing oscillator to an extent such that the disturbing harmonic does no longer fall within the tuning range of the input circuit. For this purpose, it is known to provide a resonant circuit 19, which can be tuned synchronously to the relevant input frequency of the receiver, and to which the erasing-oscillator signal is applied through the conductor 20. This resonant circuit is tuned by means of a variable capacitor 21, which is coupled with the variable capacitors 2 and 10 of the receiver. As soon as a disturbing harmonic of the erasing oscillator occurs, the resonant circuit 19 obtains a voltage which controls the frequency-detuning member 18 of the erasing oscillator. As a result, the frequency of the erasing oscillator is changed, as soon as one of its harmonics might disturb the radio part, in accordance with the value so that the relevant harmonic gets beyond the tuning of the radio part.

According to the invention this resonant circuit has connected to it a selective amplifier 22 and, in addition, a converter 23, formed by a detector. The selective amplifier is formed by a mixing stage 24, connected to the resonant circuit 19, to which stage is applied the same oscillator signal as that applied to the mixing stage of the receiving part and by an I.F. amplifier 25, having the same intermediate frequency as the receiver. The more selective is the amplification of the harmonic of the erasing oscillator appearing across the resonant circuit 19, the more accurate is the detuning of the erasing oscillator, so that it is ensured that the frequency-detuning member becomes operative even at a very slight disturbance or to prevent other signals applied to the resonant circuit 19, which do not interfere with the radio part, from rendering the frequency-detuning member operative. As a converter 23 for obtaining the control-magnitude of the frequency-detuning member 18 a detector formed by a discriminator is employed for porducing a continuous frequency-detuning of the erasing oscillator, which discriminator also serves for the demodulation of frequency-modulated signals and for assessing whether with the relevant tuning of the resonant circuit a signal appears or does not appear. The output signal of this converter 23 constitutes the control-magnitude of the frequency-detuning member 18, which may be formed by a capacitative diode through which the frequency of the erasing oscillator can be changed.

The operation is such that, as soon as as a harmonic of the erasing oscillator approaches the tuning frequency of the receiver, the discriminator produces a control-magnitude, which detunes the oscillator frequency so that the relevant harmonic of this changed frequency invariably lies beyond the tuning range. Such a discriminator provides a control-magnitude of different polarity in accordance with the sense of approach of the disturbing frequency, that is to say from low frequencies to high frequencies or conversely, so that the erasing oscillator frequency is detuned to a lower or a higher frequency respectively, invariably in a sense away from the tuning frequency. This prevents a change of the erasing oscillator frequency such that the interference crosses the tuning range.

By the measures described above any disturbance of the radio receiver by the recording apparatus is avoided. In this embodiment the aerial 3 is a ferrite rod-shaped aerial of the kind usually employed for longwave and mediumwave ranges. Such aerials are particularly sensitive to disturbing radiations, since the circuit coil cannot be screened. By means of the device described above, however, any disturbance of the radio receiver by the recording apparatus can be eliminated.

A frequency-detuning member, particularly for continuous detuning of the frequency, that can be used advantageously in the preceding embodiment and the erasing oscillator are shown in FIG. 2. The erasing oscillator 16 is formed by a transistor 27, the collector circuit of which includes a transformer 28, to which the erasing head 17 and a capacitor 29 are connected, these elements, in common, determining the frequency. Feedback is obtained through a winding 30 of the transformer 28. The transformer itself is in this case a so-called transductor and for this purpose it is provided with an additional winding 31. In accordance with the variation of the direct current passing through the winding 31, the inductance of the transformer varies and hence also the frequency of the erasing oscillator. This transductor thus forms part of the frequency-detuning member, which furthermore comprises a transistor 32, through which the direct current passing through the winding 31 is adjusted. The base of the transistor 32 receives the control-magnitude produced by the converting or control-member 23.

From the foregoing it will be obvious that the resonant circuit 19 and the selective amplifier connected thereto serve, in particular, to emphasize as far as possible the harmonics of the erasing oscillator in order to ensure that the frequency-detuning member becomes operative. As is shown in FIG. 2 a further step is taken for this purpose by applying the erasing-oscillator signal to the resonant circuit 19 through a distortion circuit 33. This filter is formerd by a transistor 36 with feedback through a capacitor 34 and an emitter resistor 35, the feedback factor being chosen so that a more or less sawtooth-like voltage appears at the emitter of the transistor. Therefore, the content of harmonics of this voltage is considerably higher than that of the sinusoidal oscillator voltage. As a result, even harmonics of higher order, occurring with a slight amplitude in the erasing-oscillator signal, are capable of producing an adequate voltage across the resonant circuit.

FIG. 3 shows an embodiment in which, at the appearance of a disturbance, the erasing oscillator is detuned abruptly instead of continuously, so that when a disturbing frequency is attained, the frequency of the erasing oscillator is changed over by a constant, value, whilst the oscillator continues operating at this frequency until this frequency again produces a disturbance at a different tuning, after which the oscillator is rechanged to the initial frequency. This has the advantage that the frequency-detuning member can be constructed in a very simple manner, but it is a condition that the signal produced at the appearance of a disturbance should be stored until the next disturbance appears. However, after an abrupt detuning the signal causing the frequency change is suppressed as such. Storing is therefore necessary for maintaining the signal and hence the frequency change produced and for preventing the oscillator to return to its disturbing frequency. This principle provides furthermore the possibility of using the mixing stage 4 of the receiver, the I.F.-stage 5 and the detector 6 for the demodulation of the I.F. voltage in addition for processing the signal of the resonant circuit, by rendering said parts adjustable by means of a switching circuit to the disturbance-suppressing device.

As is shown in FIG. 3 a switching circuit 37 is provided to this end. In the rest position thereof, as shown, the ferrite aerial is connected to the mixing stage 4, whilst the receiver can be tuned in a conventional manner. In the operational position of the switching circuit 37 the mixing stage 4 has connected to it the resonant circuit 19 and the detector 6 has connected to it, with the interposition of a bistable multivibrator 38 for storing signals in its operational position, the frequency-detuning member 18.

The operation is such that the switching circuit 37 is normally in the rest position. The receiver can be tuned at will. If a record has to be made, the switching circuit 37 is switched on, after tuning and simultaneously with the recording apparatus, for example by coupling the switches concerned. During the switching time the switching circuit 37 is in the operational position in which the mixing stage 4 is connected to the resonant circuit 19, to which the erasing-oscillator signal is applied. It is thus assessed whether the erasing oscillator has a disturbing effect on the tuning concerned. If this is not the case no voltage appears across the resonant circuit; nothing occurs, since no control-magnitude is produced for actuating the frequency-detuning member of the erasing oscillator. If a disturbance appears and if the disturbing harmonic of the oscillator reaches the mixing stage, which converts it into an I.F. signal, which is rectified in the detector, this signal is available as a control-magnitude, which is applied through the switching circuit 37 to the bistable multivibrator 38, which is connected at this instant by the switching circuit 37 to the detector. As soon as the multivibrator receives such a signal, it changes over its position and remains, in this new position, so that in this position the incoming control-magnitude is stored, even when the switching circuit 37 has returned to its rest position. The change-over of the bistable multivibrator is transferred to the frequency-detuning member 18, which thus also changes its position so that the frequency of the erasing oscillator is changed to an extent such that the harmonic of the same order is no longer included in the tuning of the receiver. The detuning should, of course, not be chosen too great, in order to avoid that another harmonic becomes disturbing with the changed frequency. In accordance with the bandwidth of the receiver the detuning will therefore be chosen so that the new harmonic of the same order as the initial disturbing harmonic is at a small distance from the pass range of the tuning. In practice it is found that for long waves a detuning of the erasing-oscillator frequency of about 4 kc./s. and for medium waves a detuning of about 1 kc./s. are favourable. When the switching circuit 37 returns to its rest position, the disturbance is suppressed, so that the recording process is not disturbed at all.

An apparatus based on the principle described with reference to FIG. 3 for medium wave and long wave reception is shown in FIG. 4 in detail. This apparatus comprises a push-button device 40 for wave-range control. The medium wave range is switched on in the figure; the button 41 with the cam 42 is hooked onto the longitudinally displaceable rail 43. The long wave knob 44 is in the rest position. With these knobs are coupled sliding switches 45 and 46, which change over the wave range. These switches comprise, in addition, the switching circuit 37 for controlling the frequency-detuning member of the erasing oscillator. The operational position of the switching circuit 37 is obtained in the position of the push-buttons 41 and 44 respectively, into which they are pushed beyond their positions corresponding to the wave ranges, that is to say, when the buttons are depressed. This position is determined by the stops 47 and 48 respectively, co-operating with the rail 43. A resonant circuit **19*a* and 19*b* is added to the respective wave ranges in accordance with the input circuits 1*a* and 1*b* respectively, having a ferrite rod-like aerial, between which the variable capacitor 2 can be controlled. In this embodiment the switching circuit 37 and the variable capacitor 2 of the input circuits are simultaneously actuated to form the resonant circuits, so that it is sufficient to employ a twin capacitor 2, 10 of conventional type. With medium wave reception the switches 49 and 50 are closed; they form the input circuit 1*a*, which is connected to the self-oscillating mixing stage 4. With long wave reception the switches 51 and 52 are used, whilst the switch 53** controls the receiver oscillator in a conventional manner.

When the medium wave button 41 is depressed, so that the switching circuit 37 is moved into the operational state, the resonant circuit **19*a* is formed via the switch 54, whilst the variable capacitor 2 is connected in parallel with the inductor 72 and is connected via the switch 55 to the mixing stage 4. At the same time a Schmitt trigger 58 is connected via the switch 56 to the I.F. stage 5, which trigger controls the multivibrator 38**. The Schmitt trigger serves for recording a threshold value, in excess of which the whole frequency-detuning member has to respond, whilst it forms at the same time a defined control-signal for the multivibrator. The Schmitt trigger is connected for direct current to the A.V.C.-governed I.F. stage so that not only the I.F. amplification but also the gain control of the receiver are utilized for producing the control-magnitude.

The frequency-detuning member 18 of the erasing oscillator 16 is formed in this case by a switching circuit including a relay 59, which is controlled by the bistable multivibrator 38. As soon as the transistor 60 of the multivibrator becomes conducting, the relay 59 is energized and thus connects a further circuit element 63 in parallel with a circuit element 62, which contributes to the determination of the frequency of the erasing oscillator, so that the frequency of the oscillator is detuned by a fixed value. The relay may advantageously be formed by a relay having contacts in a non-aggressive gas. Instead of the relay, an electronic switch, for example, a transistor may be employed.

The erasing-oscillator signal is applied to the resonant circuits 19*a* and 19*b* from a point 64 of the oscillator, where the oscillator signal is deformed comparatively strongly by the feedback 65 through an input in parallel with an inductor 66, connected in series with the resonant circuits 19*a* and 19*b*. This inductor 66 further emphasizes the harmonics of the oscillator signal. Together with the capacitor 67 the inductor 66 may form a high-pass filter.

When the long wave button 44 is depressed, the switch 68 forms the resonant circuit 19*b* and the switch 69 connects it to the mixing stage 4, whilst a switch 70 maintains the operation of the receiver oscillator. Via the switch 71 the Schmitt trigger is connected to the I.F. stage 5.

This embodiment operates like the embodiment shown in FIG. 3. Any disturbance is assessed and eliminated by detuning the erasing oscillator by means of a depression of the buttons 41 and 44 respectively of the wave-ranges. As a matter of course, the erasing oscillator should then be operative. For this purpose, the erasing oscillator may be connected to the supply voltage when said buttons are depressed. This is not shown in FIG. 4. As an alternative, an erasing oscillator may be provided, which oscillates continuously and it is then only necessary to connect thereto the erasing head and the capacitor 15 for the high-frequency premagnetisation of the magnetic head 14, when the recording apparatus is switched on. In this manner any possibility of disturbance is avoided before a disturbance can become operative. It has been found to be particularly advantageous to combine this disturbance suppression, that is to say, the control of the switching circuit 37 with the switch actuating the recording process by means of the switch 13 and the like in a predetermined manner. In this connection it is particularly advantageous that the control-member for switching on the recording process is often provided with a member to be adjusted by a separate control for avoiding erroneous actuation. The blocking can be obviated in this case by depressing the buttons 41 or 44, for example, by a simple displacement of a locking bolt. In this way prior to each recording process an automatic check is made to assess the presence of a disturbance, which is then suppressed.

What is claimed is:

1. An apparatus for simultaneous radio reception of a first selected frequency and recording the received radio signals comprising a resonant circuit tuned to the first selected frequency, a recording oscillator coupled to said resonant circuit and having a second selected frequency and a harmonic thereof of a frequency value in the range of the frequency of said first frequency, a local oscillator differing from said first selected frequency by an intermediate frequency, means for generating an interference signal when said first frequency is in harmonic relationship with said second frequency including a mixer stage coupled to said local oscillator and to said recording oscillator for receiving said harmonic of said second frequency and having an output tuned to said intermediate frequency, and a frequency detuning member coupled to said interference signal generating means and said recording oscillator, said detuning member responsive to the interference signal for detuning said recording oscillator.

2. A device as claimed in claim 1 further comprising means to emphasize the harmonics of the erasing oscillator including a distortion circuit through which the recording oscillator signal is applied to the resonant circuit.

3. A device as claimed in claim 1 further comprising means to emphasize the harmonics of the erasing oscillator including an inductor connected in series with the resonant circuit, the erasing oscillator signal being applied to this inductor.

4. A device as claimed in claim 1 wherein said frequency detuning element comprises a transductor for determining the frequency of the recording oscillator.

5. An apparatus as claimed in claim 1 further comprising means for switching said mixing stage between said receiver circuit and said generating means.

6. An apparatus as defined in claim 5 further comprising a bistable multivibrator coupled between said mixing stage and said frequency detuning member.

7. An apparatus as defined in claim 6 further comprising a Schmitt trigger having a threshold level coupled between said bistable multivibrator and said mixing stage.

8. An apparatus as defined in claim 7 wherein said generating means further comprises an intermediate frequency amplifier coupled to said mixing stage and said Schmitt trigger, and a rectifier coupled between said intermediate frequency amplifier and said frequency detuning member.

9. An apparatus as defined in claim 8 further comprising means for automatically controlling the gain of said intermediate frequency amplifier, and means for preventing said Schmitt trigger from being operated by said first frequency signal including means for varying said threshold level in accordance with said automatic gain control means.

References Cited

UNITED STATES PATENTS

| | | | |
|---|---|---|---|
| 3,294,917 | 12/1966 | Lempert | 179—100.11 |
| 2,491,808 | 12/1949 | Flyer | 179—100.11 |
| 2,572,157 | 10/1951 | Kay | 179—100.11 |
| 3,177,454 | 4/1965 | Van Dijkum | 331—36 |
| 2,302,893 | 11/1942 | Roberts | 331—36 |
| 2,920,146 | 1/1960 | Grift | 179—100.2 |

OTHER REFERENCES

Gratian, J. W.: "Noise in Magnetic Recording Systems as Influenced by Bias and Erase Signals," "Journal of Acoustical Society of America," vol. 21, No. 2, pp. 74–81, March 1949.

Millman and Taub: "Pulse, Digital and Switching Waveforms," McGraw-Hill Co., New York, 1965, pp. 263–364, 389–391.

A. E. Knowlton: "Standard Handbook for Electrical Engineers," McGraw-Hill Co., New York, 1957, pp. 2079–2082.

BERNARD KONICK, Primary Examiner

J. ROSENBLATT, Assistant Examiner

U.S. Cl. X.R.

179—100.2; 331—36